US012002921B2

(12) United States Patent
Takeuchi et al.

(10) Patent No.: US 12,002,921 B2
(45) Date of Patent: Jun. 4, 2024

(54) SOLID-STATE SILVER-LITHIUM / IODINE DUAL-FUNCTION BATTERY FORMED VIA SELF-ASSEMBLY

(71) Applicant: The Research Foundation for the State University of New York, Albany, NY (US)

(72) Inventors: Esther S. Takeuchi, South Setauket, NY (US); Kenneth J. Takeuchi, South Setauket, NY (US); Amy C. Marschilok, Setauket, NY (US)

(73) Assignee: THE RESEARCH FOUNDATION FOR THE STATE UNIVERSITY OF NEW YORK, Albany, NY (US)

(*) Notice: Subject to any disclaimer, the term of this patent is extended or adjusted under 35 U.S.C. 154(b) by 315 days.

(21) Appl. No.: 15/749,480

(22) PCT Filed: Aug. 1, 2016

(86) PCT No.: PCT/US2016/045068
§ 371 (c)(1),
(2) Date: Jan. 31, 2018

(87) PCT Pub. No.: WO2017/023884
PCT Pub. Date: Feb. 9, 2017

(65) Prior Publication Data
US 2018/0226676 A1 Aug. 9, 2018

Related U.S. Application Data

(60) Provisional application No. 62/200,493, filed on Aug. 3, 2015.

(51) Int. Cl.
*H01M 10/0525* (2010.01)
*H01M 10/052* (2010.01)
(Continued)

(52) U.S. Cl.
CPC ..... *H01M 10/0525* (2013.01); *H01M 10/052* (2013.01); *H01M 10/0562* (2013.01);
(Continued)

(58) Field of Classification Search
None
See application file for complete search history.

(56) References Cited

U.S. PATENT DOCUMENTS 3,455,742 A * 7/1969 Rao .............. H01M 6/182
429/318
3,712,836 A 1/1973 Bro et al.
(Continued)

FOREIGN PATENT DOCUMENTS

JP 55-128201 A * 10/1980 .............. C03C 3/12
WO 2017023884 A1 2/2017

OTHER PUBLICATIONS

Written Report of the International Searching Authority, ISA/US, established Sep. 30, 2016, 6 pp.
(Continued)

*Primary Examiner* — Jonathan Crepeau
*Assistant Examiner* — Angela J Martin
(74) *Attorney, Agent, or Firm* — Scully, Scott, Murphy & Presser, P.C.

(57) ABSTRACT

A novel silver-lithium-iodine solid-state energy device and system are disclosed. The rechargeable, self-assembled, dual-function, metal-iodide battery exhibits small size and high deliverable power. Inert until activation, the device may be stored for long periods of time. Upon activation, the device assembles the required electrochemical moieties for operation without external intervention. The device limits short-circuiting and self-discharge of the system by spontaneous reactions at the electrode/electrolyte interfaces, and thus is self-healing. By incorporating both silver and lithium
(Continued)

in the same system, a dual function is achieved, whereby the characteristics of a lithium-based battery dominate at a low load and those of a silver-based battery dominate under a high load.

21 Claims, 4 Drawing Sheets

(51) Int. Cl.
  H01M 10/0562 (2010.01)
  H01M 10/0567 (2010.01)
  H01M 10/0568 (2010.01)
  H01M 10/44 (2006.01)
  H01M 50/46 (2021.01)
  H01M 50/497 (2021.01)
(52) U.S. Cl.
  CPC ... *H01M 10/0567* (2013.01); *H01M 10/0568* (2013.01); *H01M 10/446* (2013.01); *H01M 50/46* (2021.01); *H01M 50/497* (2021.01)

(56) References Cited

U.S. PATENT DOCUMENTS

| | | | |
|---|---|---|---|
| 3,969,139 A | 7/1976 | Lai | |
| 4,003,753 A | 1/1977 | Hall | |
| 4,048,395 A | 9/1977 | Lai | |
| 4,150,203 A * | 4/1979 | Liang | H01M 6/18 |
| | | | 429/320 |
| 4,228,224 A | 10/1980 | Heredy et al. | |
| 4,886,715 A | 12/1989 | McCullough, Jr. et al. | |
| 4,929,521 A | 5/1990 | Cipriano et al. | |
| 4,952,466 A | 8/1990 | Cipriano et al. | |
| 4,965,146 A | 10/1990 | McCullough, Jr. et al. | |
| 5,428,501 A * | 6/1995 | Bruder | H01G 9/08 |
| | | | 361/502 |
| 5,455,999 A | 10/1995 | Weiss et al. | |
| 6,096,453 A | 8/2000 | Grunwald | |
| 6,576,371 B1 * | 6/2003 | Yasuda | H01M 10/0565 |
| | | | 429/315 |
| 7,479,353 B2 | 1/2009 | Hollenkamp et al. | |
| 7,579,112 B2 | 8/2009 | Chiang et al. | |
| 8,192,863 B2 | 6/2012 | Best et al. | |
| 8,332,028 B2 | 12/2012 | Visco et al. | |
| 8,451,584 B2 | 5/2013 | Zhou et al. | |
| 8,617,736 B2 | 12/2013 | Bhatt et al. | |
| 8,697,279 B2 | 4/2014 | Kniajanski et al. | |
| 8,889,298 B2 | 11/2014 | Zhamu et al. | |
| 8,993,169 B2 | 3/2015 | Hart et al. | |
| 9,013,155 B2 | 4/2015 | Ehrenberg | |
| 9,293,269 B2 | 3/2016 | Ehrenberg | |
| 9,305,716 B2 | 4/2016 | Tan et al. | |
| 9,543,564 B2 | 1/2017 | Fasching et al. | |
| 9,834,724 B2 * | 12/2017 | Kim | C09K 11/025 |
| 9,960,451 B1 | 5/2018 | Zhamu et al. | |
| 10,170,789 B2 | 1/2019 | Zhamu et al. | |
| 10,388,983 B2 | 8/2019 | Zhamu et al. | |
| 10,490,358 B2 | 11/2019 | Feaver et al. | |
| 10,601,074 B2 | 3/2020 | Read et al. | |
| 10,658,705 B2 | 5/2020 | Read et al. | |
| 10,673,077 B2 | 6/2020 | Lockett et al. | |
| 10,763,051 B2 | 9/2020 | Bendale et al. | |
| 10,777,806 B2 | 9/2020 | Zhou et al. | |
| 10,797,313 B2 | 10/2020 | Zhamu et al. | |
| 10,854,868 B2 | 12/2020 | Morin | |
| 10,957,956 B2 | 3/2021 | Morin et al. | |
| 11,276,885 B2 | 3/2022 | Lockett et al. | |
| 11,335,899 B2 | 5/2022 | Collins et al. | |
| 11,411,254 B2 | 8/2022 | Bradwell et al. | |
| 2005/0019666 A1 * | 1/2005 | Yasuda | H01M 6/181 |
| | | | 29/623.5 |
| 2007/0076444 A1 * | 4/2007 | McNulty | H02J 7/35 |
| | | | 363/16 |
| 2008/0145758 A1 * | 6/2008 | Kim | H01M 4/485 |
| | | | 429/219 |
| 2009/0004560 A1 * | 1/2009 | Amatucci | H01B 1/122 |
| | | | 429/164 |
| 2010/0008589 A1 | 3/2010 | Suematsu | |
| 2010/0068569 A1 * | 3/2010 | Suematsu | H01M 8/04097 |
| | | | 429/412 |
| 2011/0097623 A1 * | 4/2011 | Marinis, Jr. | H01M 2/0285 |
| | | | 429/163 |
| 2011/0223487 A1 * | 9/2011 | Johnson | H01M 10/052 |
| | | | 429/231.95 |
| 2012/0301778 A1 * | 11/2012 | Trevey | H01M 4/043 |
| | | | 429/231.95 |
| 2015/0102016 A1 * | 4/2015 | Bruck | C22C 1/10 |
| | | | 219/73.2 |
| 2015/0279573 A1 * | 10/2015 | Horiuchi | H01L 51/4226 |
| | | | 136/263 |
| 2018/0226676 A1 | 8/2018 | Takeuchi et al. | |

OTHER PUBLICATIONS

Bock et al., "Batteries used to power implantable biomedical devices," Electrochemica Acta v. 84, pp. 155-164, Mar. 23, 2012.
Holmes, "The Bourner Lecture: Electrochemical power sources—an important contributor to modern health care," Journal of Power Sources, v. 65, pp. xv-xx, Nov. 21, 1996.
Brodd et al., "Batteries, 1977 to 2002," Journal of the Electrochemical Society, v. 151, No. 3, pp. K1-K11, Jan. 26, 2004.
Takeuchi et al., "Lithium Batteries for Biomedical Applications," MRS Bulletin, pp. 624-627, Aug. 2002.
Schlaikjer et al., "Ionic Conduction in Calcium Doped Polycrystalline Lithium Iodide," Journal of the Electrochemical Society, v. 118, No. 9, pp. 1447-1450, Sep. 1971.
Schmidt et al., "Development of an equivalent-circuit model for the lithium/iodine battery," Journal of Power Sources, v. 65, pp. 121-128, Nov. 9, 1996.
Weinstein et al., "Electrochemical Impedance Spectroscopy of Electrochemically Self-Assembled Lithium-Iodine Batteries," Journal of The Electrochemical Society, v. 155, No. 8, pp. A590-A598, Jun. 23, 2008.
Liu et al., "An all solid-state rechargeable lithium-iodine thin film battery using LiI(3-hydroxypropionitrile)2 as an I-ion electrolyte," Energy & Environmental Science, v. 4, pp. 1261-1264, Jan. 21, 2011.
Tallon, "Defects and the first-order phase transitions in AgI," Physical Review B, v. 36, No. 1, pp. 776-778, Jul. 1, 1987.
Hull, "Superionics: crystal structures and conduction processes," Reports on Progress in Physics, v. 67, pp. 1233-1314, Jun. 14, 2004.
Geller, "Silver Iodide Based Solid Electrolytes," Accounts of Chemical Research, v. 11, pp. 87-94, 1978.
Agrawal et al., "Superionic solids: composite electrolyte phase—an overview," Journal of Materials Science, v. 34, pp. 1131-1162, Mar. 15, 1999.
Dudney, "Composite Electrolytes," Annual Review of Materials Science, v. 19, pp. 103-120, 1989.
Shahi et al., "Ionic Conductivity and Thermoelectric Power of Pure and Al2O3-Dispersed AgI," Journal of The Electrochemical Society, v. 128, No. 1, Jan. 1981.
Yamada et al., "Extremely High Silver Ionic Conductivity in Composites of Silver Halide (AgBr, AgI) and Mesoporous Alumina," Advanced Functional Materials, v. 16, pp. 525-530, Dec. 21, 2005.
Pyun et al., "Effect of plastic deformation on ionic conduction in pure AgI and AgI-Al2O3 composite solid electrolytes," Journal of Power Sources, v. 63, pp. 109-113, Jul. 22, 1996.
Wasiucionek et al., "Electrical conductivity and phase transformations in the composite ionic conductors AgI: α-Al2O3 prepared via a high-pressure route," Solid State Ionics, v. 192, pp. 113-117, May 31, 2010.
Owens, "Silver Solid State Energy Storage Devices," Fast Ion Transport in Solids, pp. 259-269, 1993, the Netherlands.
Durga Rani et al., "Electrical Conductivity and Thermoelectric Power of Silver Iododichromate Fast Ion Conducting Electrolytes," Cryst. Rest. Technol., v. 30, No. 5, pp. 703-709, 1995.

(56) References Cited

OTHER PUBLICATIONS

Liang et al., "A High-Voltage, Solid-State Battery System, I. Design Considerations," Journal of The Electrochemical Society, v. 116, No. 9, pp. 1322-1323, Sep. 1969.

Liang et al., "A High-Voltage, Solid-State Battery System, II. Fabrication of Thin-Film Cells," Journal of The Electrochemical Society, v. 116, No. 10, pp. 1452-1323, Oct. 1969.

Liang, "Conduction Characteristics of the Lithium Iodide-Aluminum Oxide Solid Electrolytes," Journal of The Electrochemical Society, v. 120, No. 10, pp. 1289-1292, Oct. 1973.

Canadian Office Action dated Sep. 15, 2023, received in a corresponding foreign application, 3 pages.

* cited by examiner

SOLID-STATE SILVER-LITHIUM / IODINE DUAL-FUNCTION BATTERY FORMED VIA SELF-ASSEMBLY

BACKGROUND

The invention relates to electrochemical energy storage systems. In particular it relates to dual-function secondary batteries formed by self-assembly and containing silver iodide and lithium iodide.

Lithium Iodine Batteries

Implantable medical devices require batteries with high volumetric energy density (expressed in Wh/l) and reliability, thus this field can provide several examples of the design and development of novel battery types incorporating these characteristics (D. C. Bock, et. al, "Batteries used to power implantable biomedical devices," *Electrochim. Acta*, 84, 155 (2012), which is incorporated by reference in its entirety).

The lithium/iodine-polyvinylpyridine (PVP) system has been used to power cardiac pacemakers due to its high energy density, safety, and reliability (C. F. Holmes, "The Bourner Lecture: electrochemical power sources—an important contributor to modern health care," *J. Power Sources*, 65, xv (1997) and R. J. Brodd, et al., "Batteries, 1977 to 2002," *J. Electrochem. Soc.*, 151, K1 (2004) ("Brodd"), each of which is incorporated by reference in its entirety). It is based on the reaction:

$$Li + \tfrac{1}{2}I_2 \rightarrow LiI \quad [1]$$

(E. S. Takeuchi, et al., "Lithium batteries for biomedical applications," *MRS Bulletin*, 27, 624 (2002), which is incorporated by reference in its entirety). During discharge, a LiI layer, acting as both a separator and solid electrolyte, forms in situ (Brodd). The ionic conductivity of LiI has been measured and determined to be $6.5 \times 10^{-7}$ S/cm at 25° C. Thus, as the thickness of the LiI layer grows during progression of discharge, the cell impedance increases (C. R. Schlaikjer, et al., "Ionic Conduction in Calcium Doped Polycrystalline Lithium Iodide," *J. Electrochem. Soc.*, 118, 1447 (1971), which is incorporated by reference in its entirety). The increase in cell impedance can be determined from impedance spectroscopy, which has been used to develop an equivalent-circuit model for ohmic and non-ohmic voltage losses (C. L. Schmidt, et al., "Development of an equivalent-circuit model for the lithium/iodine battery," *J. Power Sources*, 65, 121 (1997), which is incorporated by reference in its entirety).

Recent investigations of lithium-iodine batteries include examination of the Li/I system as a secondary (rechargeable) battery. The electrochemical self-assembly of lithium-iodine batteries in which the cells consist of a polyiodide cathode, lithium anode, and LiI electrolyte has been demonstrated (L. Weinstein, et al., "Electrochemical Impedance Spectroscopy of Electrochemically Self-Assembled Lithium-Iodine Batteries," *J. Electrochem. Soc.*, 155, A590 (2008), which is incorporated by reference in its entirety). Cell behavior and the self-assembly process were characterized by electrochemical impedance spectroscopy (EIS or dielectric spectroscopy). More recently, a solid-state, rechargeable thin film $Li/I_2$ battery has been constructed by coating a thin LiI (3-hydroxypropionitrile)$_2$ (LiI(HPN)$_2$) electrolyte film onto a Li anode plate, which is then reacted with $I_2$ vapor (F.-C. Liu, et al., "An all solid-state rechargeable lithium-iodine thin film battery using LiI (3-hydroxypropionitrile)$_2$ as an I-ion electrolyte," *Energy & Environmental Science*, 4, 1261 (2011), which is incorporated by reference in its entirety).

Silver Ion Conductors

Among the first discovered crystalline ionic conductors is silver iodide, AgI. Below 147° C., AgI exists in two phases: the beta phase, a hexagonal phase with the wurtzite structure, and the gamma phase that has the zincblende crystal structure. The ionic conductivities of these phases have been measured at $10^{-6}$-$10^{-7}$ S/cm (25° C.). Above 147° C., however, AgI exists in the alpha phase (see FIG. 2) in which the anions form a body-centered cubic (bcc) lattice, where the cations are considerably more mobile and an enhanced Ag ion conductivity is observed (J. L. Tallon, "Defects and the first-order phase transitions in AgI," *Physical Review B*, 36, 776 (1987), which is incorporated by reference in its entirety). The I$^-$ anions (8) form a bcc lattice while the Ag$^+$ ions occupy several of a number of equivalent-energy sites. The Ag$^+$ ions tend to occupy the tetrahedral sites (10) while diffusion occurs through the octahedral (12) and trigonal (14) sites (V. M. Nield, et al., "Structure and fast-ion conduction in α-AgI," *Solid State Ionics*, 66, 247 (1993), A. N. Durga Rani, et al., "Electrical Conductivity and Thermoelectric Power of Silver Iododichromate Fast Ion Conducting Electrolytes," *Cryst. Res. Technol.*, 30, 703-709 (1995), and S. Hull, "Superionics: crystal structures and conduction processes," *Rep Prog Phys*, 67, 1233 (2004), each of which is incorporated by reference in its entirety). Indeed, the ionic conductivity in the alpha phase increases by six orders of magnitude to approximately $10^{-1}$ S/cm (T>147° C.) (B. B. Owens, "Silver Solid State Energy Storage Devices," in *Fast Ion Transport in Solids*, B. Scrosati, et al., (eds.), Kluwer Academic Publishers, The Netherlands, pp. 259-269 (1993), which is incorporated by reference). A possible rationale for the high ionic conductivity associated with the α-AgI phase is the relatively large number of vacant holes in equivalent-energy positions for Ag$^+$ ions to occupy (S. Geller, "Silver iodide based solid electrolytes," *Accounts Chem Res*, 11, 87 (1978) ("Geller"), which is incorporated by reference in its entirety). Because of the high ratio of structurally and energetically equivalent available positions to the number of Ag$^+$ ions, the movement of Ag$^+$ ions through the crystal in the presence of an electric field is greatly facilitated.

After the discovery of the ionic conductor AgI, research was conducted to modify and improve the Ag$^+$ ion conductivity, ionic transfer number, and the stability of the electrolyte, as shown in Table 1. A composite of AgI and an insulator can result in an ion conducting composite (R. C. Agrawal, et al., "Superionic solid: composite electrolyte phase—an overview," *J Mater Sci*, 34, 1131 (1999) and N. J. Dudney, "Composite electrolytes," *Annu Rev Mater Sci*, 19, 103 (1989), each of which is incorporated by reference in its entirety). In general, composite electrolytes are solid systems containing multiple distinct phases, frequently two crystal phases or a crystalline and a glass phase together. For example, insulating oxides have been dispersed in AgI or AgCl and have been found to enhance the ionic conductivity. In one early study, $Al_2O_3$ was added to AgI and the authors observed that smaller $Al_2O_3$ particles led to a larger increase in ionic conductivity (K. Shahi, et al., "Ionic Conductivity and Thermoelectric Power of Pure and $Al_2O_3$-Dispersed AgI," *J Electrochem Soc*, 128, 6 (1981), which is incorporated by reference in its entirety). Presumably, the increased surface area of the $Al_2O_3$ either allows for more conduction pathways or lowers the energy required for the Ag$^+$ ion to hop from one site to the next.

In a more recent study, the increase in conductivity in AgI and AgBr with 30% mesoporous $Al_2O_3$ is attributed to the space-charge model, which states that Ag$^+$ ions are adsorbed at the surface of the oxide leading to a high number of anion defects in those regions and thus more vacancies for the mobile $Ag^+$ ions (H. Yamada, et al., "Extremely high silver ionic conductivity in composites of silver halide (AgBr, AgI) and mesoporous alumina," *Adv Funct Mater,* 16, 525 (2006) ("Yamada"), which is incorporated by reference in its entirety). However, stacking defaults in hexagonal β-AgI can also contribute to enhanced ion conductivity. (See references in Table 1: Yamada; S. I. Pyun, et al., "Effect of plastic deformation on ionic conduction in pure AgI and AgI•$Al_2O_3$ composite solid electrolytes," *Journal of Power Sources,* 63, 109 (1996) ("Pyun"); and M. Wasiucionek, et al., "Electrical conductivity and phase transformations in the composite ionic conductors AgI: α-$Al_2O_3$ prepared via a high-pressure route," *Solid State Ionics,* 192, 113 (2011) ("Wasiucionek"), each of which is incorporated by reference in its entirety.)

TABLE 1

Ionic Conductivities and Activation Energies of AgI with Additives

| Material | Ionic Conductivity at 25° C. (S/cm) | $E_a$ (eV) | Reference |
|---|---|---|---|
| AgI (bulk, beta phase) | $6.0 \times 10^{-7}$ | 0.42 | Yamada |
| 0.8 AgI + 0.2 $Al_2O_3$ | $3. \times 10^{-5}$ | | Pyun |
| 0.8 AgI + 0.2 $Al_2O_3$, compressed at 550 MPa | $1 \times 10^{-4}$ | | Pyun |
| 0.7 AgI + 0.3 $Al_2O_3$ (mesoporous) | $3.1 \times 10^{-3}$ | 0.23 | Yamada |
| 0.8 AgI + 0.2 $Al_2O_3$ (high pressure synthesis, before heating) | $\sim 1 \times 10^{-1}$ | 0.26 | Wasiucionek |
| 0.8 AgI + 0.2 $Al_2O_3$ (high pressure synthesis, after heating) | $\sim 1 \times 10^{-3}$ | 0.40 | Wasiucionek |

The greatest enhancements of ionic conductivity appear to result from cationic substitution forming crystals of the form $MAg_4I_5$ where M=Rb, K, $NH_4$, or other ions. $RbAg_4I_5$ and $KAg_4I_5$ have room temperature ionic conductivities of ~0.3 S/cm, some of the highest discovered to date. This extremely high ionic conductivity is due to the fact that these materials are in the alpha phase at room temperature and have a large number of vacant sites for the $Ag^+$ ions to occupy; $RbAg_4I_5$, for example, has 16 $Ag^+$ ions spread non-uniformly across 56 sites (Geller).

While advances have been made in iodide-based secondary batteries, there remain challenges in constructing iodide-based secondary batteries that can be used in implantable medical devices and other challenging applications. Accordingly, one of the objectives of the invention is to develop a solid-state rechargeable lithium-silver/iodine battery based on self-assembly of the active materials.

Other objectives include preparing and characterizing mixtures at various ratios of silver iodide and lithium iodide, and choosing mixtures with the inclusion of additives selected to enhance conductivity based on silver ion mobility.

A further objective is to fabricate and activate cells based on the selected lithium-silver iodide composites. Yet another goal is to electrochemically characterize the performance of the lithium-silver/iodine dual-function cells.

SUMMARY

The disclosed invention includes a self-assembled, self-healing, solid-state battery based on a silver-containing ionic conductor, e.g., silver iodide (AgI), combined with a lithium halide, such as lithium iodide (LiI). Other lithium halides may include LiF, LiCl, LiBr, and LiAt. Specifically, a mixture of lithium iodide and silver iodide may be formed in a layer between two conductive contacts. Voltage may be applied between the two contacts for the formation (activation) phase of the battery. Initially, silver ions, $Ag^+$, and/or lithium ions, $Li^+$, may diffuse toward the negative electrode and be reduced to silver) ($Ag^0$) and/or lithium ($Li^0$) metal. Iodine ion, $I^-$, may diffuse toward the positive electrode and be oxidized to elemental iodine, $I_2$. As the activation step for the battery continues, more $Ag^+$ and/or $Li^+$ may diffuse toward the negative electrode forming a silver and/or lithium metal layer accompanied by the formation of additional iodine at the cathode. A layer of lithium and/or silver iodide may remain and serve as both the separator and electrolyte in the battery, as depicted in FIG. 1.

The detailed description addresses the fabrication, formation, characterization, and electrochemical testing of solid-state lithium-silver/iodine batteries. The secondary batteries may be prepared utilizing lithium iodide and silver iodide (or other silver-containing ionic conductor) over a range of compositions. Additionally, composites may further enhance the ion mobility of the electrolyte. Composites based on aluminum oxide, $Al_2O_3$, have been selected based on certain benefits, although other composites may be employed in their place. Enhanced ionic conductivity by several orders of magnitude is predicted for composite electrolytes compared to silver iodide itself. (See Table 2.)

Several preparation methods for $Al_2O_3$-based composites are described and all provide conductivity advantages, which would benefit the novel battery system. The use of aluminum oxide is also deliberately selected as it is expected that it will not participate in the electrochemical process of cell activation and cell discharge. Thus, the enhanced ionic conductivity of the electrolyte should be retained after cell activation as well as through discharge and charge during which the ratio of metal iodide and aluminum oxide will vary.

In addition to the $Al_2O_3$-based composites, other additives such as the $MAg_4I_5$ family (where M=Rb, K, etc.) may be used. Since $RbAg_4I_5$ has shown some of the highest conductivity values to date for a silver ion conductor, it is expected that this would result in a battery with high power (watt-hour or Wh) capability. In contrast, the $KAg_4I_5$ would show volumetric benefit due to the smaller alkali metal ion. These two materials may be selected as additives and utilized for realizing an improvement in the novel lithium-silver/iodine battery.

In some embodiments, the invention comprises an energy storage device comprising first and second conductive contacts (electrodes), a separator, and an electrolyte. In some embodiments both the separator and the electrolyte comprise lithium iodide and a silver-containing ionic conductor. In some embodiments they comprise a mixture of silver iodide and lithium iodide. In additional embodiments the separator and electrolyte may comprise a single layer comprising lithium iodide or a mixture of lithium iodide and silver iodide.

In some embodiments self-discharge and short-circuiting are limited by reactions of the silver and/or lithium iodide at electrode-electrolyte interfaces. These embodiments are deemed "self-healing."

In some embodiments a method of making a solid-state, dual-function, metal-iodide energy storage device is described. In some embodiments the method includes situating a mixture of silver iodide and lithium iodide between two conductive contacts and applying a voltage between the contacts. In some embodiments, the activation of the energy storage device by applying an initial voltage between the contacts results in silver and/or lithium ions moving toward the negative electrode (conductive contact) and iodide ions moving toward the positive electrode (conductive contact) where it is oxidized to elemental iodine. In some embodiments further application of an initial voltage may result in additional lithium and/or silver ions migrating toward the negative electrode while more iodide ions migrate toward the positive electrode. In some embodiments a mixture of silver iodide and lithium iodide remains between the two electrodes after this activation.

In some embodiments the invention contemplates the use of the novel solid-state, dual-function, metal-iodide energy storage device. The device may be used to power external devices ("loads") by removing the applied voltage and allowing a current to flow through an external circuit including the load. During this phase of operation the device is said to discharge its energy content ("discharge"). Due to the presence of both silver iodide and lithium iodide in the system, the energy storage device may be used to power both low (microamp) and high (milliamp) loads. Examples of uses of the novel energy storage device include powering devices requiring small batteries, such as sensors, telemetry devices, medical devices (including implantable devices), automotive devices, and communications devices, as well as other devices for which batteries are preferably small.

This, being a summary, is necessarily brief and does not put forth all of the features and advantages of the novel energy storage system, its method of making, or its use in various applications. The invention may be more fully understood with reference to the drawings and the detailed description that follow.

BRIEF DESCRIPTION OF THE DRAWINGS

FIG. 3A shows the XRD pattern of silver metal (red) with the reference pattern (blue). FIG. 3B shows the XRD pattern of silver after exposure to iodine at room temperature including the reference pattern for silver iodide (AgI).

DETAILED DESCRIPTION

Figure 1:
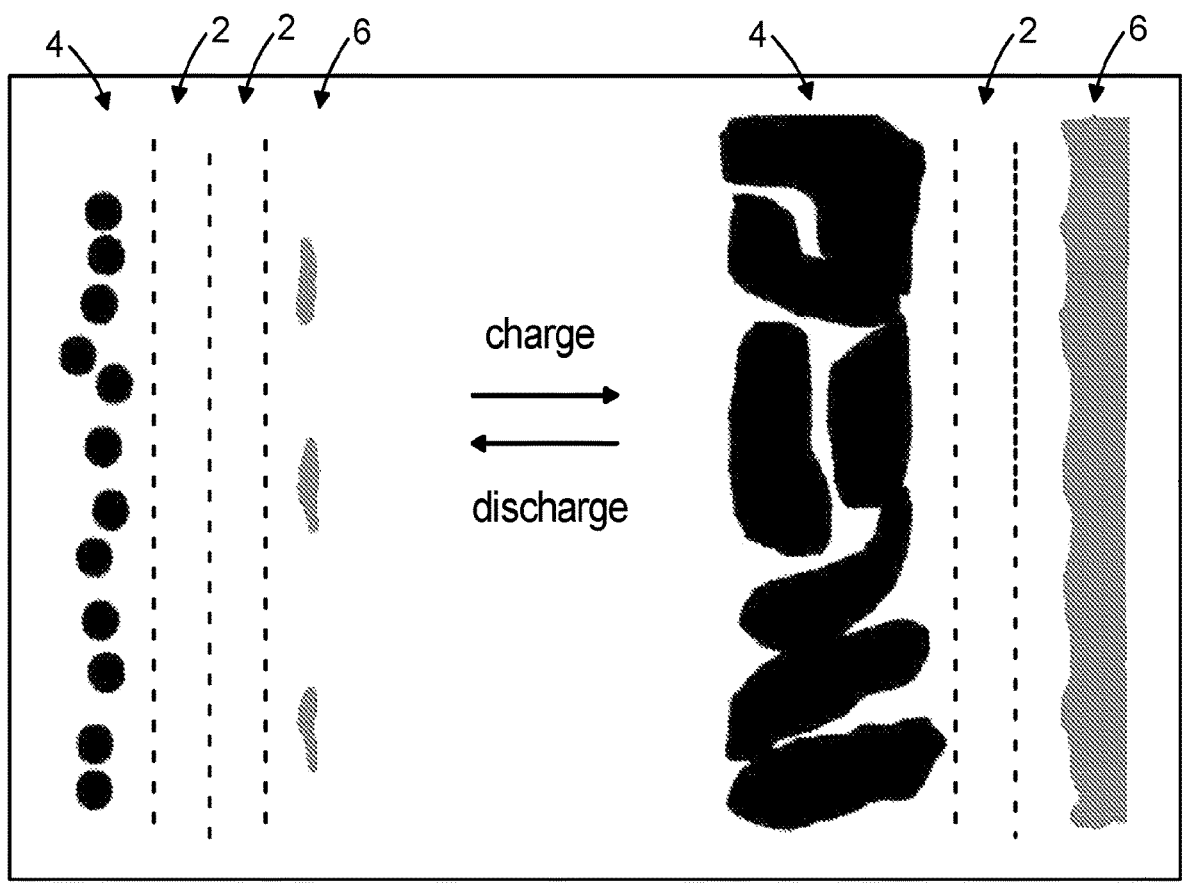
FIG. 1 is a schematic drawing of a silver-lithium/iodine solid-state, dual-function energy storage cell.
Figure 2:
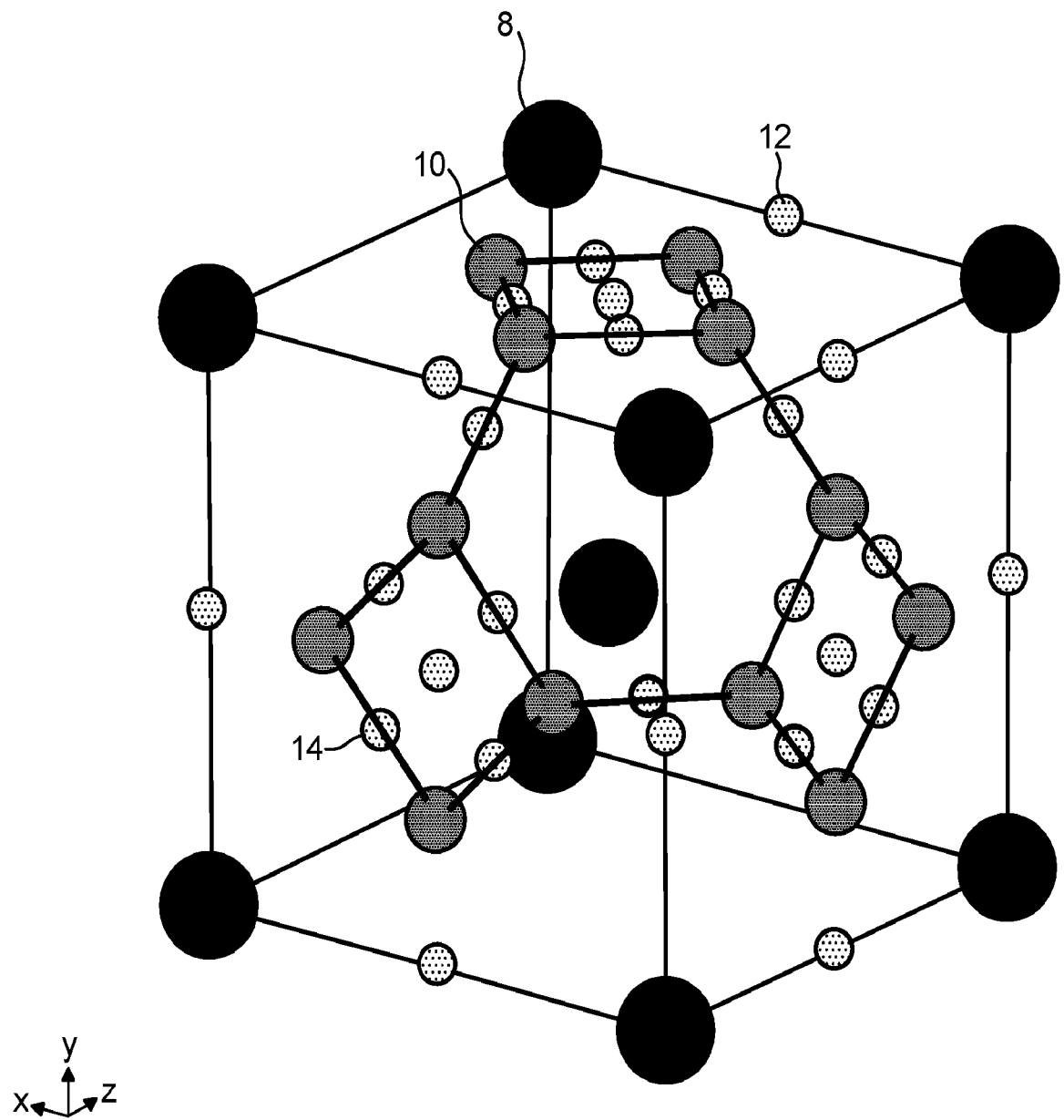
FIG. 2 is an artist's rendition of the crystal structure of $\alpha$-AgI.

The disclosed invention includes a self-assembled, self-healing, solid-state battery based on a silver-containing ionic conductor, such as silver iodide (AgI), combined with a lithium halide, such as lithium iodide (LiI). Other lithium halides may include LiF, LiCl, LiBr, and LiAt. Specifically, a mixture of lithium iodide and silver iodide may be formed in a layer (2) between two conductive contacts (4, 6). Voltage may be applied between the two contacts (4, 6) for the formation (activation) phase of the battery. Initially, the positive ions (silver ion, $Ag^+$, and/or lithium ion, $Li^+$) may diffuse toward the negative electrode (6) and be reduced to silver metal, $Ag^0$ and/or lithium metal, $Li^0$. Iodine ion, $I^-$, may diffuse toward the positive electrode (4) and be oxidized to elemental iodine, $I_2$. As the activation step for the battery continues, more positive ions may diffuse toward the negative electrode (or anode) (6) forming a metal layer comprising lithium and/or silver, while additional iodine may be formed at the cathode (4). A layer of lithium and/or silver iodide may remain and serve as both the separator (2) and electrolyte (2) in the battery, as depicted in FIG. 1.

This description addresses the fabrication, formation, characterization, and electrochemical testing of solid-state silver/lithium iodide batteries. The batteries may be prepared utilizing lithium iodide and silver iodide over a range of compositions. Additionally, composites may further enhance the ion mobility of the electrolyte. Composites based on aluminum oxide, $Al_2O_3$, have been selected for the examples based on certain benefits, although other composites may be employed in their place. Ionic conductivity enhanced by several orders of magnitude is predicted for composite electrolytes compared to silver iodide itself. (See Table 2.) Several preparation methods for $Al_2O_3$-based composites have been described and all provide conductivity advantages, which would benefit the proposed battery system. Aluminum oxide is also deliberately selected as it is expected that it will not participate in the electrochemical process of cell activation and cell discharge. Thus, the enhanced ionic conductivity of the electrolyte should be retained after cell activation as well as through discharge and charge where the ratio of metal iodide and aluminum oxide will vary.

In addition to the $Al_2O_3$-based composites, other additives such as the $MAg_4I_5$ family (where M=Rb, K, etc.) may be used. Since $RbAg_4I_5$ has shown some of the highest conductivity values to date for a silver ion conductor, it is expected that this would result in a battery with high power capability. In contrast, the $KAg_4I_5$ would show volumetric benefit due to the smaller alkali metal ion. These two materials may be selected as additives and utilized for their contribution to an improvement in the novel lithium-silver/iodine battery.

In some embodiments, the invention comprises an energy storage device in which both the separator and the electrolyte comprise lithium and/or a silver-containing ionic conductor, e.g., silver iodide. In some embodiments, it comprises an energy storage device in which both the separator and the electrolyte comprise lithium and/or silver iodide. In some embodiments they comprise a mixture of silver iodide and lithium iodide. In additional embodiments the separator and electrolyte may comprise a single layer comprising lithium iodide or a mixture of lithium iodide and silver iodide.

Referring to FIG. 1, the inventive energy storage device contains a separator/electrolyte layer (2) between two conductive contacts (electrodes) (4, 6). More specifically, in one embodiment the first electrode is a cathode (4) comprising elemental iodine, the second electrode is an anode (6) comprising lithium and/or silver metal, and an iodide layer (2) in between the cathode (4) and the anode (6) serves as separator (2) and electrolyte (2). During charging (while a voltage is applied between the two electrodes) ions migrate from the iodide layer to the respective electrodes. During discharge (while a current is allowed to flow from the device through an external circuit, optionally comprising an element to be powered, or a "load") ions flow away from the electrodes toward the central iodide layer.

A method of making a solid-state, dual-function, metal-iodide energy storage device is described. In some embodiments the method includes situating a mixture of silver iodide and lithium iodide between two conductive contacts and applying a voltage between the contacts. In some embodiments, the activation of the energy storage device by applying an initial voltage between the contacts results in silver and/or lithium ions moving toward the negative electrode (anode) (conductive contact) and iodide ions moving toward the positive electrode (cathode) (conductive contact) where they are oxidized to elemental iodine. In some embodiments further application of an initial voltage may result in more positive ions migrating toward the negative electrode, while more iodide ions migrate toward the positive electrode. In some embodiments a mixture of silver iodide and lithium iodide remains between the two electrodes after activation.

The disclosed invention contemplates the use of the novel solid-state, dual-function, metal-iodide energy storage device. The device may be used to power external devices ("loads") by removing the applied voltage and allowing a current to flow through an external circuit including the load. During this phase of operation the device is said to discharge its energy content ("discharge"). Due to the presence of both silver iodide and lithium iodide in the system, the energy storage device may be used to power both low (microamp) and high (milliamp) loads. Applications of the energy storage device and systems containing it may include powering devices requiring small batteries, such as sensors, telemetry devices, medical devices (including implantable devices), automotive devices, and communications devices, as well as other devices for which batteries are preferably small.

The presence of both lithium iodide and silver iodide in the electrolyte provides several advantages. A lithium-based battery has a higher voltage capacity and thus higher energy density compared to a silver anode battery. However, the presence of silver provides the opportunity to enhance ion conductivity of the solid electrolyte. Additionally, silver may reduce the impedance of the lithium anode-electrolyte interface providing for the possibility of higher power levels. Thus, it is envisioned that under a low load (of the order of microamperes ($\mu A$)), the primary reaction will be lithium reacting with iodine to form lithium iodide. However, under a high load (of the order of milliamperes (mA)) where more polarization occurs, the silver reaction with iodine will initiate, providing for higher conductivity of the solid electrolyte resulting in higher levels of available power. Thus, the dual-function battery is expected to provide enhanced power capability compared to lithium/iodine alone, while still retaining high energy density.

One advantage gained from a rechargeable, self-assembled, dual-function, metal-iodine battery is small size and high deliverable power. Thus, several advantages can be envisioned over the lithium-iodine system alone. The conductivity of lithium iodide and pure silver iodide are both $\sim 10^{-7}$ S/cm. Significant gains in power density over the pure lithium iodide system may be realized with the development of an electrolyte including a silver ion conductor with a conductivity approaching $10^{-1}$ S/cm. On a volumetric basis, the pure lithium/iodine system has an energy density of 1536 Wh/l, while the silver/iodine system has an energy density of 599 Wh/l. Thus, the molar ratio of the Ag content in cell may be maintained at or below 25% to ensure that the energy density of the overall cell is greater than or equal to 1300 Wh/l, assuming a linear relationship between composition and energy density.

A chart comparing capacity, voltage, and energy density of the pure battery systems and the conductivity of the electrolytes is provided in Table 2. The dual-function battery provides the opportunity to obtain the benefits of each system, in which the lithium-based system yields high voltage and energy density when the load is low while the silver component provides high power density when high current is demanded from the system (high load conditions). (Note that 1 Wh/ℓ =1 mWh/cm$^3$; the latter notation is used in Table 2.)

TABLE 2

Comparison of silver-iodine versus lithium-iodine batteries

| System comparison | Silver-Iodine Battery | Lithium-Iodine Battery |
|---|---|---|
| Anode capacity, mAh/cm$^3$ | 2609 | 2047 |
| Volumetric capacity, mAh/cm$^3$ | 882 | 549 |
| Cell voltage, V | 0.7 | 2.8 |
| Volumetric energy density, mWh/cm$^3$ | 599 | 1536 |
| Electrolyte conductivity, S/cm | $\sim 1.0 \cdot 10^{-1}$ | $\sim 1.0 \cdot 10^{-7}$ |

EXAMPLES

In Situ Formation of Silver Iodide

Figure 3A:
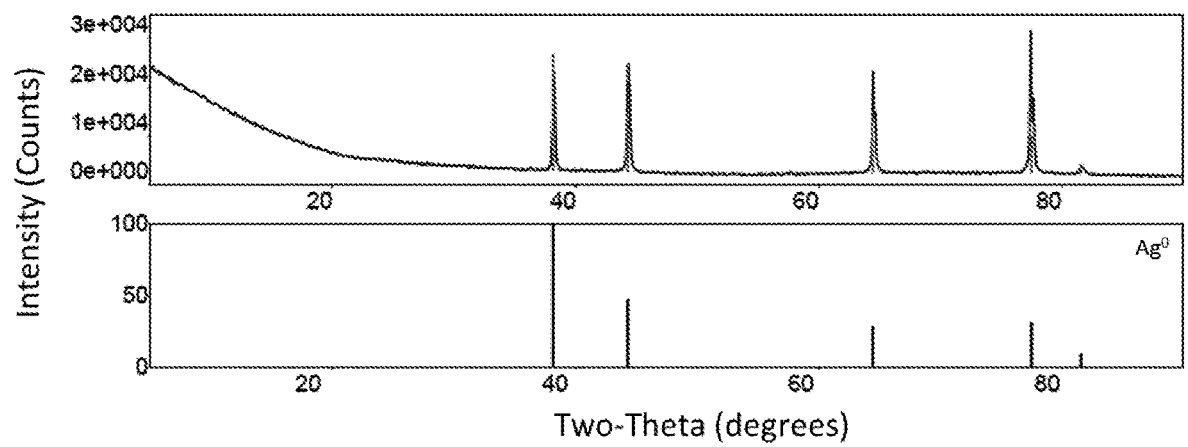
FIGS. 3A and 3B are x-ray diffraction (XRD) patterns showing the reaction of silver metal with solid iodine.
Figure 3B:
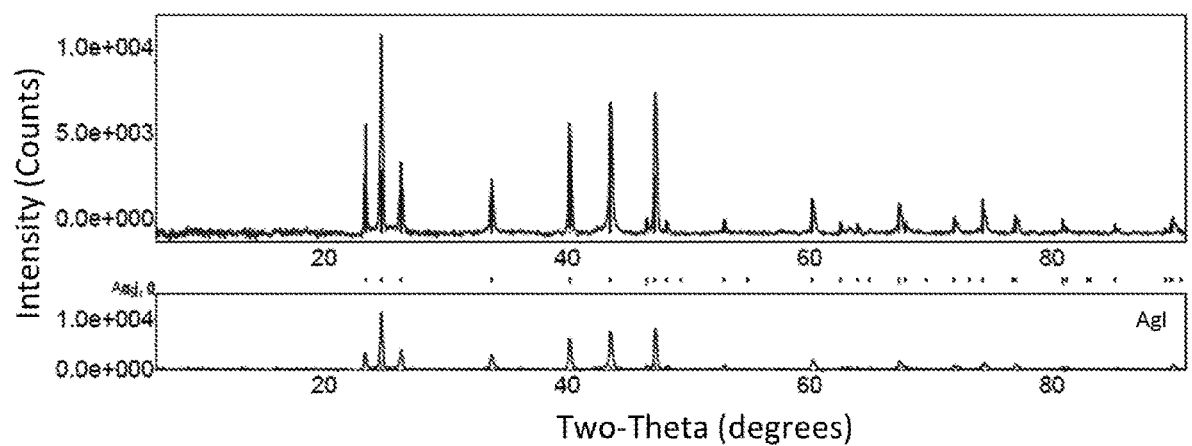

Reactivity of silver metal and iodine was explored. Silver metal foil was placed in a vial containing solid iodine at room temperature. The x-ray powder pattern of silver metal was recorded prior to placing the sample in the vessel and after exposure to the iodine as seen in FIGS. 3A (before) and 3B (after). In FIGS. 3A and 3B the top trace is that measured while the bottom trace is an ideal XRD pattern of silver metal (3A) and silver iodide (3B). The formation of silver iodide is clearly seen at room temperature, confirming spontaneous reaction of silver with iodine at room temperature.

Silver-Lithium Interactions

Figure 4:
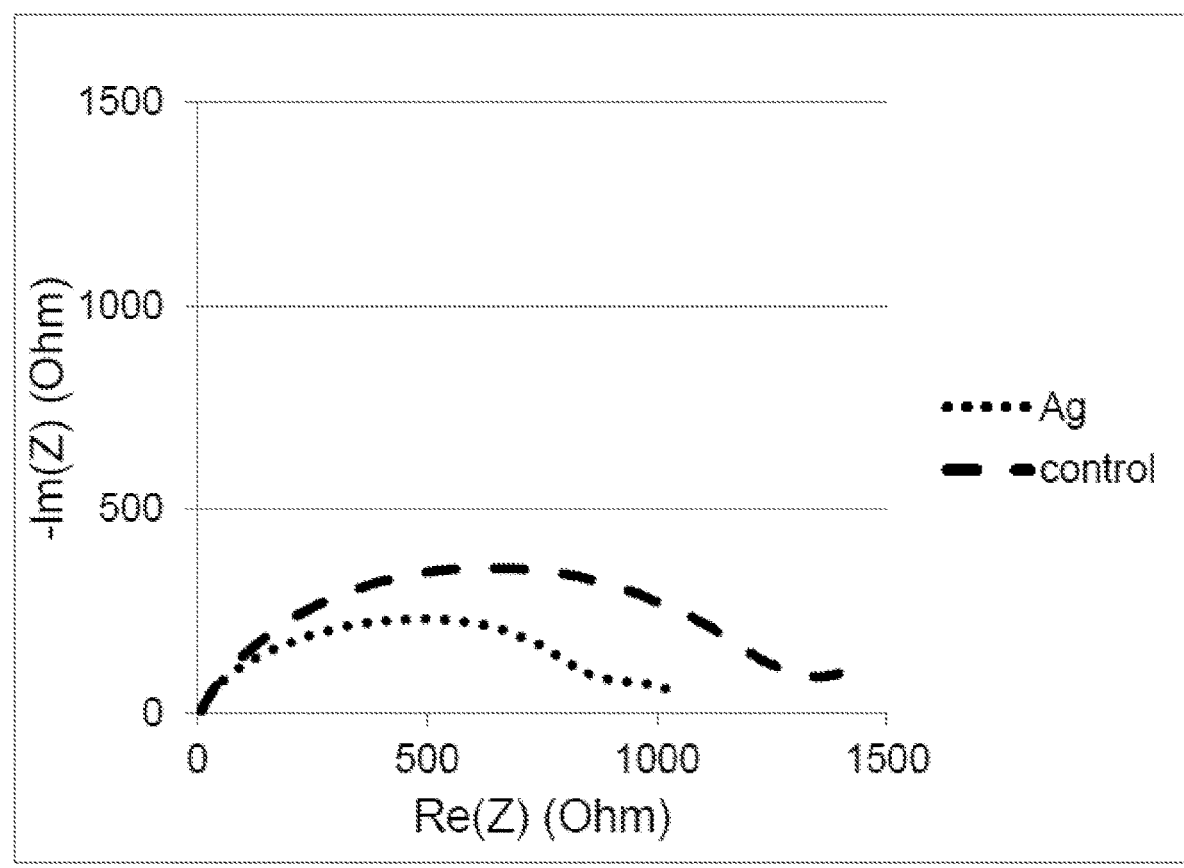
FIG. 4 is an electrochemical impedance spectrogram showing the variation of the imaginary part of the impedance as a function of the real part of the impedance to obtain the electrochemical impedances for lithium-lithium cells comparing untreated lithium (control) with silver ion-treated lithium.

The impact of silver on a lithium anode was studied. Lithium surfaces were pretreated with silver ion-containing solutions and compared to untreated lithium surfaces. Lithium-lithium cells were assembled and the electrochemical impedance spectrum was determined for the control (untreated) lithium cells, as well as for those pretreated with silver ion, as shown in FIG. 4. The impedance of the silver-treated lithium surfaces is lower than that of untreated lithium. While the test conditions of these cells are different in that the measurements were done using liquid electrolytes, the results suggest that the presence of silver metal in the dual-function battery may assist in maintaining a low impedance interface between the anode and the solid electrolyte.

Experimental Protocol

The battery may be constructed starting from a mixture of AgI and LiI salts, inside a stainless steel housing, between two conductive plates serving as electrical current collector contacts. In such a construction, for example, stainless steel may serve as the positive current collector, and nickel or stainless steel the negative current collector. When a potential is applied, the battery may be formed in situ, with lithium and/or silver depositing on the negative current collector and iodine depositing on the positive current collector.

The uniformity of the LiI/AgI mixture may be controlled by the processing method for mixing the materials. Various methods of mixing (mechanical, ball mill, micronizing mill, wet mixing) and forming (pelletizing, tape casting, spray deposition, spin coating) the LiI/AgI composite are envisioned. Both wet and dry processing methods are feasible.

While the above is a description of what are presently believed to be the preferred embodiments of the invention, various alternatives, modifications, and equivalents may be used. For example, silver iodide has fast ionic conduction properties. However, other fast ion conductors may exhibit similar properties when mixed with LiI. Those skilled in the art will realize that other and further embodiments can be made without departing from the spirit of the invention, and it is intended to include all such further modifications and changes as come within the true scope of the following claims. Therefore, the above description should not be taken as limiting the scope of the invention, which is defined solely by the claims.

We claim:

1. An energy storage device comprising:
   first and second conductive contacts;
   a separator and an electrolyte located between the first and second conductive contacts; wherein both the separator and electrolyte comprise lithium iodide and a silver-containing ionic conductor; and wherein said lithium iodide and said silver-containing ionic conductor that provide said electrolyte are in a uniform mixture.

2. The energy storage device of claim 1, wherein the silver-containing ionic conductor is silver iodide.

3. The energy storage device of claim 2, wherein: the first conductive contact comprises iodine; and the second conductive contact comprises lithium and silver.

4. The energy storage device of claim 3, further comprising: an additive selected from the group consisting of aluminum oxide and compositions having the formula $MAg_4I_5$ where M=Rb, K, $NH_4$, or other univalent cations.

5. The energy storage device of claim 2, wherein: the molar ratio of silver to lithium in the energy storage device is less than or equal to 0.25.

6. A method of making the energy storage device of claim 2, the method comprising: interposing a uniform mixture of silver iodide and lithium iodide between the first and second conductive contacts; and activating the energy storage device by applying an initial voltage between the first and second conductive contacts.

7. The method of claim 6, further comprising: forming silver metal at the second conductive contact upon activation of the energy storage device.

8. The method of claim 6, further comprising: forming lithium metal at the second conductive contact upon activation of the energy storage device.

9. The method of claim 6, further comprising: forming a mixture of silver metal and lithium metal at the second conductive contact upon activation of the energy storage device.

10. The method of claim 6, further comprising: forming elemental iodine at the first conductive contact upon activation of the energy storage device.

11. The method of claim 6, further comprising: forming the separator and the electrolyte between the first and second conductive contacts upon activation of the energy storage device.

12. A method of using the energy storage device of claim 2, wherein: a current is allowed to flow through an external circuit including a load.

13. The method of claim 12, wherein: the load is powered by the current flowing through the external circuit.

14. The method of claim 13, wherein the load is a sensor.

15. The method of claim 13, wherein the load is an automotive device.

16. The method of claim 13, wherein the load is a telemetry device.

17. The method of claim 13, wherein the load is a communications device.

18. The method of claim 13, wherein the load is an uninterruptable power supply.

19. The method of claim 13, wherein the load is a medical device.

20. The method of claim 19, wherein the medical device is an implantable device.

21. An energy storage device comprising:
    first and second conductive contacts;
    a separator and an electrolyte located between the first and second conductive contacts; wherein both the separator and electrolyte comprise lithium iodide and silver iodide; and
    wherein said lithium iodide and said silver iodide that provide said electrolyte are in a uniform mixture.

* * * * *